(12) United States Patent
Morita (10) Patent No.: US 6,768,568 B2
(45) Date of Patent: Jul. 27, 2004

(54) SCANNER HAVING A LIGHT BEAM INCIDENT POSITION ADJUSTING DEVICE

(75) Inventor: Takashi Morita, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/098,544

(22) Filed: Mar. 18, 2002

(65) Prior Publication Data

US 2002/0097474 A1 Jul. 25, 2002

Related U.S. Application Data

(62) Division of application No. 09/271,455, filed on Mar. 18, 1999, now abandoned.

(30) Foreign Application Priority Data

Mar. 19, 1998 (JP) .......................................... 10-092725

(51) Int. Cl.⁷ ............................................... G02B 26/08
(52) U.S. Cl. ...................... 359/196; 359/212; 359/216; 250/234
(58) Field of Search ................................ 359/196–226; 250/234–236

(56) References Cited

U.S. PATENT DOCUMENTS

| | | |
|---|---|---|
| 3,852,651 A | 12/1974 | Dufendach |
| 4,251,149 A | 2/1981 | Kimura |
| 4,918,306 A | 4/1990 | Saito |
| 4,998,790 A | 3/1991 | Iizuka et al. |
| 5,237,457 A | 8/1993 | Oono et al. |
| 5,307,104 A | 4/1994 | Hamasaki |
| 5,418,638 A | 5/1995 | Hirasawa |
| 5,606,449 A | 2/1997 | Nishiyama |
| 5,610,755 A | 3/1997 | Ohtsuka |
| 5,621,562 A | 4/1997 | Hama |
| 5,936,756 A | 8/1999 | Nakajima |

FOREIGN PATENT DOCUMENTS

JP 6-148491 5/1994

*Primary Examiner*—James Phan
(74) *Attorney, Agent, or Firm*—Greenblum & Bernstein P.L.C.

(57) ABSTRACT

A scanner is provided that has a light-beam emitter for emitting a light beam, a light-beam deflector for deflecting the light beam to scan a scanning surface, a photo-detector provided at a position outside an image-forming scanning range of the scanning surface to detect a scanning light beam before the scanning light beam starts generating a scanning line in the image-forming scanning range, a rotatable member located in front of an incident surface of the photo-detector and positioned in a recess formed on an outer surface of a housing. The rotatable member is rotatable about a rotational axis perpendicular to a plane defined by the scanning light beam by said deflector. The scanner also has an optical member provided on the rotatable member that allows the scanning light beam to pass therethrough to be incident upon the incident surface of the photo-detector, and a device for adjusting rotational position of said rotatable member about said rotational axis. A through hole through which the optical member is inserted in the housing is formed at the bottom of the recess, and the optical member is inserted into the housing through the through hole.

1 Claim, 6 Drawing Sheets

SCANNER HAVING A LIGHT BEAM INCIDENT POSITION ADJUSTING DEVICE

CROSS-REFERENCE TO RELATED APPLICATION

This application is a division of U.S. patent application Ser. No. 09/271,455, filed on Mar. 18, 1999, abandoned the content of which is incorporated herein by reference in its entirety.

BACKGROUND OF THE INVENTION

1. Field of the Invention

The present invention relates to a scanner in which a light beam is deflected to scan a scanning surface, and more specifically to a scanner which is provided with a device for adjusting an incident position of a light beam on a photo-detector used for determining the timing of commencement of writing each scanning line with respect to a scanning surface.

2. Description of the Related Art

A laser-beam printer provided with a laser-beam scanner is well known. In a laser-beam printer, a laser beam which is modulated in accordance with image signals to be output from a laser-beam emitter is deflected by a polygon mirror to scan a photoconductive surface of a photoconductive drum in the main scanning direction to thereby form a main scanning line in the photoconductive surface. The laser emission is turned ON and OFF in accordance with given image signals to draw a corresponding image (charge-latent image) on the photoconductive surface of the drum, and subsequently this image drawn on the photoconductive surface of the drum is transferred to plain paper according to a conventional electrophotographic method. Dry powder (e.g., toner) that adheres only to the charged area is applied to the drum, transferred to the plain paper and fused by heat. Such a laser-beam printer is widely used; e.g., as an output device for a computer.

In a laser-beam scanner provided in such a laser-beam printer, a photo-detector (i.e., a laser-beam detector) is generally fixed at a position outside the latent-image-forming scanning range to detect the scanning laser beam before it starts generating each scanning line. The photo-detector generates a pulse signal each time the scanning laser beam is incident on the photo-detector. The pulse signals output from the photo-detector are input to a processor, and subsequently the processor generates corresponding horizontal synchronizing pulses (HSYNC) to determine the timing of commencement of writing main scanning data, namely, writing each main scanning line.

In such a laser-beam scanner, two types of devices for adjusting the timing of commencement of writing each main scanning line with respect to the photoconductive surface of the drum (i.e., for adjusting the timing of generating horizontal synchronizing pulses) are known. In each type of adjusting device, a reflecting mirror is arranged at a position outside the latent-image-forming-scanning range to detect the scanning laser beam before it starts generating each scanning line, while a photo-detector is arranged at a position on the path of the laser beam reflected by the reflecting mirror. In one type of adjusting device, the reflecting mirror is rotatable so that the incident position of the laser beam on the photo-detector can be adjusted, which makes it possible to adjust the timing of generating horizontal synchronizing pulses. In the other type of adjusting device, the reflecting mirror is fixed while the photo-detector is linearly movable so that the incident position of the laser beam on the photo-detector can be adjusted.

In the former type of adjusting device, although the incident position of the laser beam on the photo-detector can be adjusted by rotating the reflecting mirror, it is difficult to finely adjust the incident position of the laser beam on the photo-detector. Furthermore, the reflective mirror needs to be accurately and precisely positioned on a base on which the reflective mirror is to be mounted. In the latter type of adjusting device, the position at which the photo-detector is to be arranged is quite limited. Moreover, in each type of adjusting device, in the case where the base on which the reflective mirror and the photo-detector are mounted is slightly deformed after a long period of use, the respective positions of the reflective mirror and the photo-detector deviate from their original positions. In this case, the respective positions of the reflective mirror and the photo-detector cannot be easily adjusted from outside the laser-beam apparatus.

SUMMARY OF THE INVENTION

An object of the present invention is to provide a scanner provided with a device for adjusting the incident position of a light beam on a photo-detector used for determining the timing of commencement of writing each scanning line with respect to a scanning surface, wherein the adjusting device makes it possible to finely and easily adjust the incident position of the light beam on the photo-detector.

Another object of the present invention is to provide a scanner having such an adjusting device which makes it possible to finely and easily adjust the incident position even from outside the scanner.

Other aspects, objects and advantages of the present invention will become apparent to one skilled in the art from the following disclosure and the appended claims.

According to an aspect of the present invention, there is provided a scanner including a light-beam emitter for emitting a light beam; a light-beam deflector for deflecting the light beam to scan a scanning surface; a photo-detector provided at a position outside an image-forming scanning range of the scanning surface to detect a scanning light beam before the scanning light beam starts generating a scanning line in the image-forming scanning range; a rotatable member, located in front of an incident surface of the photo-detector, that is rotatable about a rotational axis perpendicular to a plane defined by the scanning light beam by the deflector; an optical member, provided on the rotatable member, that allows the scanning light beam to pass therethrough to be incident upon the incident surface of the photo-detector; and a device for adjusting rotational position of the rotatable member about the rotational axis.

Preferably, the light-beam deflector includes a polygon mirror.

Preferably, a signal, output from the photo-detector, is used for detecting the timing for commencement of writing the scanning line with respect to the scanning surface.

The optical member can include a cylindrical lens or a plane-parallel plate. Preferably, the optical member includes a member having an optical axis which lies in a plane defined by the scanning light beam, and the rotational axis extends perpendicular to the optical axis.

The rotatable member can be positioned in a recess formed in a housing to be rotatable about the rotational axis.

In an embodiment, the recess is a circular recess, and the rotatable member includes a disc portion which is fitted into the circular recess to be rotatable about the rotational axis.

Alternatively, the rotatable member includes a shaft coaxial to the rotational axis, and the rotatable member is positioned in the recess with the shaft being inserted into a hole formed at the bottom of the recess so that the rotatable member is rotatable about the shaft.

Further, the recess can be formed on an outer surface of the housing, and a through hole through which the optical member is inserted in the housing is formed at the bottom of said recess, and the rotatable member is positioned in the recess with the optical member being inserted into the housing through the through hole.

For holding the rotatable member at an adjusted position, the adjusting device can include at least one set screw which penetrates into the rotatable member through a slot formed thereon to be screwed into the housing.

Alternatively, it is possible that the adjusting device includes a member, fixed to the housing, for pressing the rotatable member against the bottom of the recess. Preferably, the pressing member includes a spring. Further, the spring can be a leaf spring fixed to the housing by at least one set screw.

Preferably, the scanner further includes a device for rotating the rotatable member about the rotational axis.

In an embodiment, the rotating device includes a radial slot formed on the rotatable member to extend in a radial direction thereof; and a rotating tool engageable with the rotatable member to rotate the rotatable member about the rotational axis. Namely, the tool includes an engaging pin engageable with the radial slot, an axis of the engaging pin deviating from a rotational axis of the rotating tool.

Alternatively, the rotating device includes a circumferential gear formed on an outer peripheral surface of the rotatable member; and a rotating tool engageable with the rotatable member to rotate the rotatable member about the rotational axis. Namely, the rotating tool includes a pinon gear which is engaged with the circumferential gear.

It is preferable that the scanning surface is a photoconductive surface of a photoconductive drum.

In an embodiment, the photo-detector and the light-beam emitter are supported on a common circuit substrate and do not relatively move.

The scanner can include an fθ reflecting lens that reflects the scanning light beam deflected by the light-beam deflector to the scanning surface.

According to another aspect of the present invention, there is provided a scanner including a light-beam emitter for emitting a light beam; a light-beam deflector for deflecting the light beam to scan a scanning surface; a photo-detector provided at a position outside an image-forming scanning range of the scanning surface to detect a scanning light beam before the scanning light beam starts generating a scanning line, the photo-detector generating an output signal upon detecting the scanning light beam to determine a timing of commencement of writing the scanning line with respect to the scanning surface; and an optical member for deflecting the scanning light beam to be incident on the photo-detector in a direction to vary the timing of the scanning light beam incident upon the photo-detector.

The present disclosure relates to subject matter contained in Japanese Patent Application No. 10-92725 (filed on Mar. 19, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
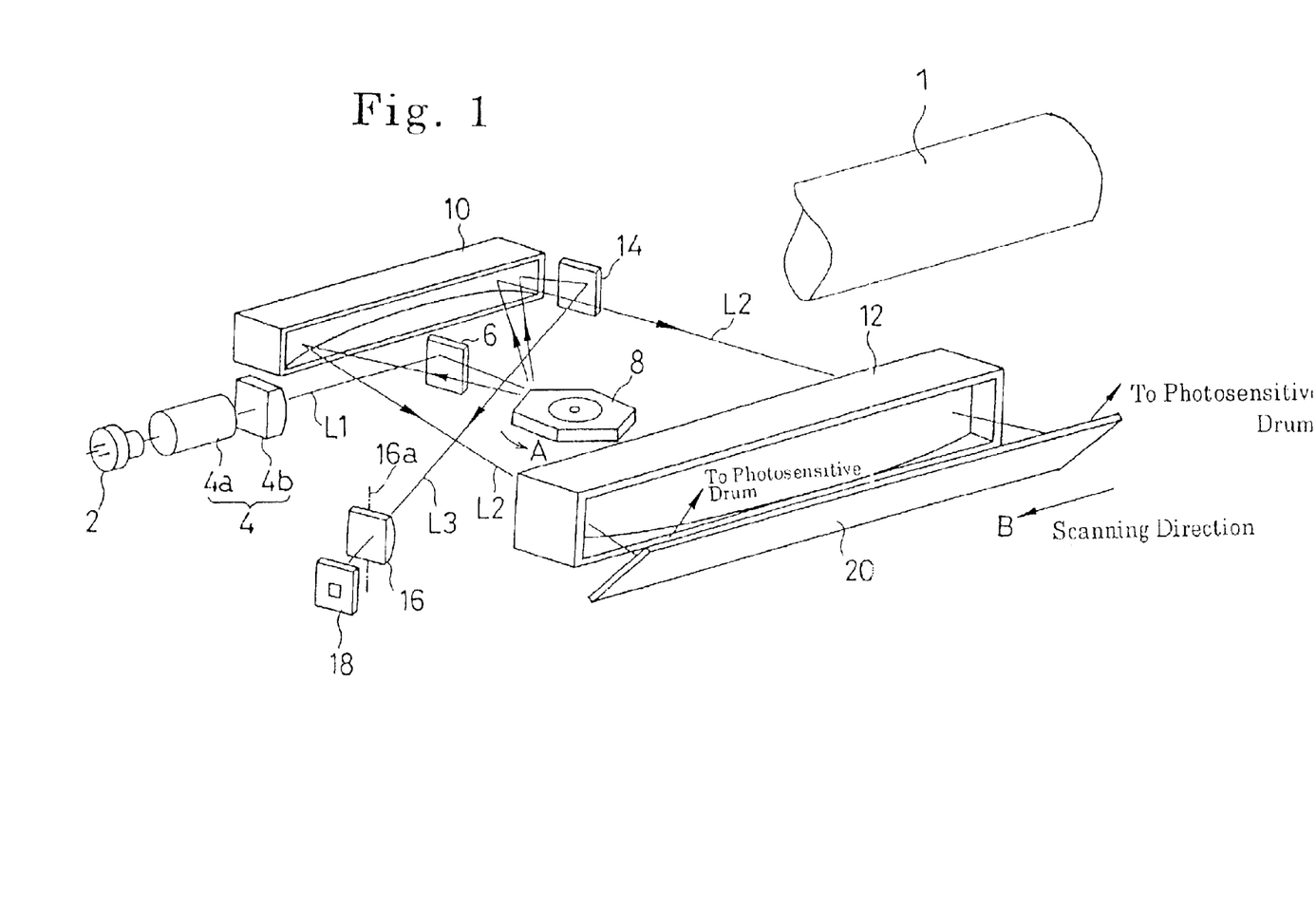
FIG. 1 is a perspective view of the scanning optical system of a laser-beam scanner to which the present invention is applied.

FIG. 1 shows the scanning optical system of a laser-beam scanner to which the present invention is applied. The laser-beam scanner scans the photoconductive surface of a photoconductive drum 1 (scanning surface). The laser beam scanner and the photoconductive drum 1 are positioned within a laser-beam printer as essential elements.

The scanning optical system of the laser-beam scanner is provided with a laser diode (light-beam emitter) 2, a collimating lens 4a, a cylindrical lens 4b, a reflecting mirror 6, a polygon mirror (light-beam deflector) 8, an fθ reflecting lens 10, an fθ lens 12, a reflecting mirror 14, a cylindrical lens (optical member) 16, and a laser-beam detector (photo-detector) 18. The collimating lens 4a and the cylindrical lens 4b together constitute an optical system 4 for the laser diode 2.

The laser diode 2 outputs a laser beam L1 modulated in accordance with image signals. The laser beam emitted from the laser diode 2 is collimated through the collimating lens 4a. Thereafter, this collimated laser beam is made incident upon the cylindrical lens 4b positioned in front of the collimating lens 4a. The cylindrical lens 4b has power in the sub-scanning direction, so that the spot of the laser beam incident thereon is converged therethrough in the sub-scanning direction to be incident upon the reflecting mirror 6. The laser beam which is incident on the reflecting mirror 6 is reflected thereby to be incident on the polygon mirror 8. The polygon mirror 8 is driven to rotate at a fast rotational speed by a motor (not shown), so that the laser beam incident on the polygon mirror 8 is deflected in the main scanning direction to be incident on the fθ reflecting lens 10.

The deflected laser beam L2 which is incident on the fθ reflecting lens 10 to be reflected thereby proceeds to the reflecting mirror 20 through the fθ lens 12, which is arranged to face the fθ reflecting lens 10. Subsequently, the laser beam incident upon the reflecting mirror 20 is reflected thereby towards the photoconductive surface of the drum 1.

The polygon mirror 8 rotates in a counterclockwise direction (shown by an arrow "A"), as viewed in FIG. 1. The reflecting mirror 14 is fixed at a position to receive the scanning laser beam emitted from the polygon mirror 8 before the scanning laser beam is incident on the fθ reflecting lens 10 at each scanning sweep while the polygon mirror 8 rotates. The laser beam L3 reflected by the reflecting mirror 14 is incident on the laser-beam detector 18 through the cylindrical lens 16. The laser-beam detector 18 is fixed at a position facing to the reflecting mirror 14 with the cylindrical lens 16 being positioned between the reflecting mirror 14 and the laser-beam detector 18. Namely, the cylindrical lens 16 is located in front of an incident surface of the laser-beam detector 18.

The laser-beam detector 18 outputs a pulse signal for detecting the timing of commencement of writing each scanning line with respect to the photoconductive surface of the drum 1 each time the laser beam L3 is incident on the laser-beam detector 18.

Figure 2:
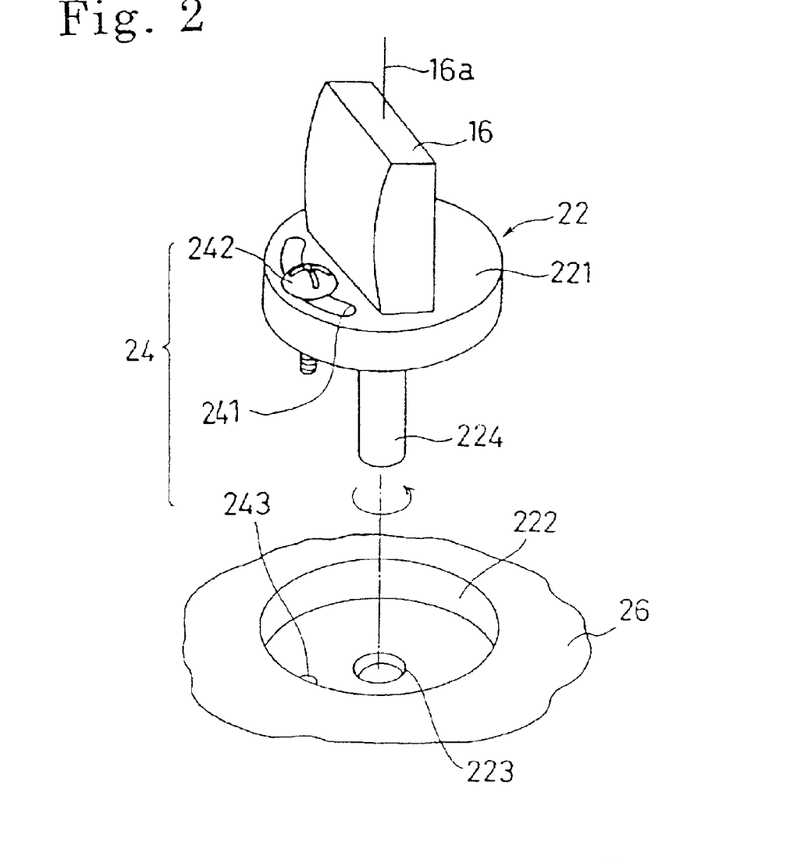
FIG. 2 is a perspective view of an embodiment of a device for adjusting the rotational position of a cylindrical lens with respect to a housing of the laser-beam scanner.

As shown in FIG. 2 the cylindrical lens 16 is fixed onto a rotatable base (rotatable member) 22 which is mounted on the housing 26 of the laser-beam scanner to be rotatable about a rotational axis 16a relative to the housing 26. The scanning optical system shown in FIG. 1 is enclosed in the housing 26. The rotational axis 16a extends perpendicular to the optical axis of the cylindrical lens 16 and the direction (path) of the laser beam L3. Note that, in this embodiment, the optical axis of the cylindrical lens 16 lies in a plane that is defined by the scanning light beam emitted from the polygon mirror 8.

The cylindrical lens 16 can be rotated about the rotational axis 16a to deflect the laser beam L3 which passes therethrough so as to shift the same substantially in parallel on a plane which is perpendicular to the rotational axis 16a to thereby either delay or advance the timing of the incident laser beam L3 on the laser-beam detector 18. Accordingly, the timing of commencement of writing each scanning line with respect to the photoconductive surface of the drum 1 can be adjusted by rotating the cylindrical lens 16.

The rotatable base 22, onto which the cylindrical lens 16 is mounted, is provided with a disc portion 221 and a shaft 224 which is formed integral with the disc portion 221. The rotatable base 22 is connected to the housing 26 so that the disc portion 221 is rotatably fitted in a circular recess 222 with the shaft 224 being rotatably fitted into a hole 223 formed at the center of the bottom of the circular recess 222. With this structure, the rotatable base 22 is rotatable about the shaft 224 with respect to the housing 26 so that the cylindrical lens 16 can rotate about the rotational axis 16a.

The rotatable base 22 is provided with a circumferential slot 241 which extends circumferentially about the rotational axis 16a. A set screw 242 is inserted into the circumferential slot 241 so that the set screw 242 is screw-engaged with a female screw hole 243 formed at the bottom of the circular recess 222. The rotatable base 22 can be rotated about the rotational axis 16a on the housing 26 when the set screw 242 is loosened while the rotatable base 22 cannot be rotated about the rotational axis 16a on the housing 26 when the set screw 242 is tightly fastened. Accordingly, the circumferential slot 241, the set screw 242 and the female screw hole 243 together constitute an adjusting device 24 for adjusting the rotational position of the cylindrical lens 16 about the rotational axis 16a and for fixing the same with respect to the housing 26.

In the laser-beam scanner having such a structure, the laser beam L1 emitted from the laser diode 2 is incident upon the reflected mirror 6 via the collimating lens 4a and the cylindrical lens 4b. Subsequently, the laser beam L1 is reflected by the reflected mirror 6 to be incident upon the polygon mirror 8. The polygon mirror 8 has a regular hexagonal cross section and is provided along a circumference thereof with six reflecting surfaces (scanning laser beam deflecting surfaces). The laser beam reflected by the reflecting mirror 6 to be incident on the polygon mirror 8 is reflected by each of the six reflecting surfaces while the polygon mirror 8 rotates. The laser beam reflected by the polygon mirror 8 is incident on the fθ reflecting lens 10. The laser beam L2 reflected by the fθ reflecting lens 10 to proceed towards the fθ lens 12 passes therethrough to be reflected by the reflecting mirror 20 to thereby proceed towards the photoconductive surface of the drum 1. The laser diode 2 is controlled to turn its laser emission ON and OFF in accordance with given image data to draw a corresponding image (charge-latent image) on the photoconductive surface of the drum 1; and subsequently, the image drawn on the photoconductive surface of the drum 1 is transferred to plain paper according to a conventional electrophotographic method.

The polygon mirror 8 is rotated at a fast rotational speed in the direction of the arrow "A" shown in FIG. 1, so that the incident angle of the laser beam L1 on each reflecting surface of the polygon mirror 8 varies. Hence, the laser beam L2 is deflected by the polygon mirror 8 in the main scanning direction (indicated by an arrow B in FIG. 1).

The laser beam L3 which is incident on the fθ reflecting lens 10 to be reflected by the reflecting mirror 14 proceeds towards the cylindrical lens 16 rather than the fθ lens 12. As described the above, when the laser beam L3 passes through the cylindrical lens 16, the laser beam L3 which proceeds towards the laser-beam detector 18 is deflected to shift substantially in parallel on a plane which is perpendicular to the rotational axis 16a. Namely, when the laser beam L3 passes through the cylindrical lens 16, the laser beam L3 which proceeds towards the laser-beam detector 18 is deflected in a direction to either delay or advance the timing of commencement of writing each scanning line with respect to the photoconductive surface of the drum 1.

Each time the laser beam L3 is incident on the laser-beam detector 18, the laser-beam detector 18 outputs a pulse signal. The pulse signals output from the laser-beam detector 18 are input to a processor (not shown), and subsequently, the processor generates corresponding horizontal synchronizing pulses (HSYNC) to determine the timing of commencement of writing main scanning data; i.e. each main scanning line.

The horizontal synchronizing pulses are input to a clock generator so that it synchronously generates corresponding clock pulses. Subsequently the clock pulses are input to a memory for storing image data, and the stored image signals are sequentially read out of the memory in accordance with the input close pulses. The laser diode 2 outputs the laser beam L1 which is modulated in accordance with the image signals read out of the memory.

The way of adjusting the angular position of the cylindrical lens 16 to deflect the incident laser beam so as to delay or advance the timing of commencement of writing each scanning line with respect to the photoconductive surface of the drum 1 will be hereinafter discussed.

First of all, the rotatable base 22 having the cylindrical lens 16 mounted thereon needs to be fitted in the circular recess 222, with the shaft 224 being fitted into the hole 223 and with the set screw 242 being engaged with the female screw hole 243 through the circumferential slot 241.

In this state, the set screw 242 is loosened and subsequently the rotatable base 22 is slightly rotated clockwise or counterclockwise about the shaft 224, i.e., the rotational axis 16a.

Figure 3A:
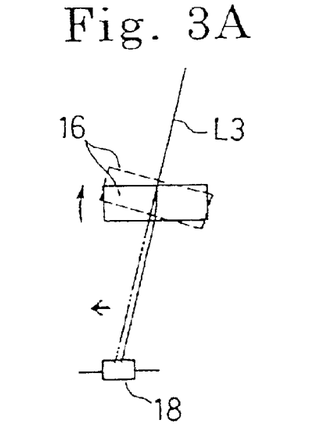
FIGS. 3A and 3B are explanatory views of the cylindrical lens when rotated about a rotational axis.

In the case where the cylindrical lens 16 is rotated clockwise as viewed in FIG. 3A from the position shown by a solid line to the position shown by a dotted line, the laser beam L3 incident on the laser-beam detector 18 is deflected to shift to the left from the position shown by a solid line to the position shown by a two-dotted chain line in FIG. 3A. When the polygon mirror 8 is rotated, the laser beam L3 is scanned (moved) from right to left in FIGS. 3A and 3B. Accordingly, the rotation of the cylindrical lens 16 as shown in FIG. 3A causes the laser-beam detector 18 to delay the output of a pulse signal to thereby delay the timing of commencement of writing each scanning line with respect to the photoconductive surface of the drum 1.

Figure 3B:
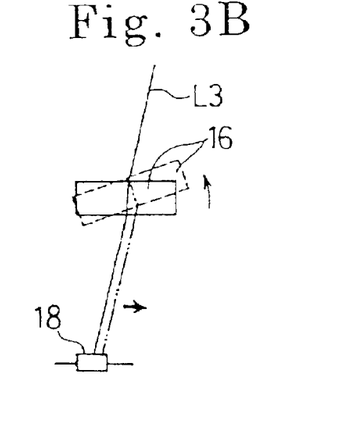

On the other hand, in the case where the cylindrical lens 16 is rotated counterclockwise as viewed in FIG. 3B from the position shown by a solid line to the position shown by a dotted line, the laser beam L3 incident on the laser-beam detector 18 is deflected to shift to the right from the position shown by a solid line to the position shown by a two-dotted chain line in FIG. 3B. This makes the laser-beam detector 18 to advance the output of a pulse signal to thereby advance the timing of commencement of writing each scanning line with respect to the photoconductive surface of the drum 1.

After the adjustment of the timing of commencement of writing each scanning line is completed, the set screw 242 is tightly fastened to fix the disc portion 221 to the circular recess 222 of the housing 26, which completes the adjusting operation. The cylindrical lens 16, the rotatable base 22, the circular recess 222 and the adjusting device 24 together constitute a light beam incident position adjusting device.

It can be appreciated from the foregoing that the incident position of the laser beam L3 with respect to the laser-beam detector 18 can be easily and precisely adjusted by rotating the rotatable base 22 about the rotatable axis 16a. Hence, with the light beam incident position adjusting device, the timing of commencement of writing each scanning line with respect to the photoconductive surface of the drum 1 can be easily and precisely adjusted by rotating the rotatable base 22 about the rotatable axis 16a.

Figure 4:
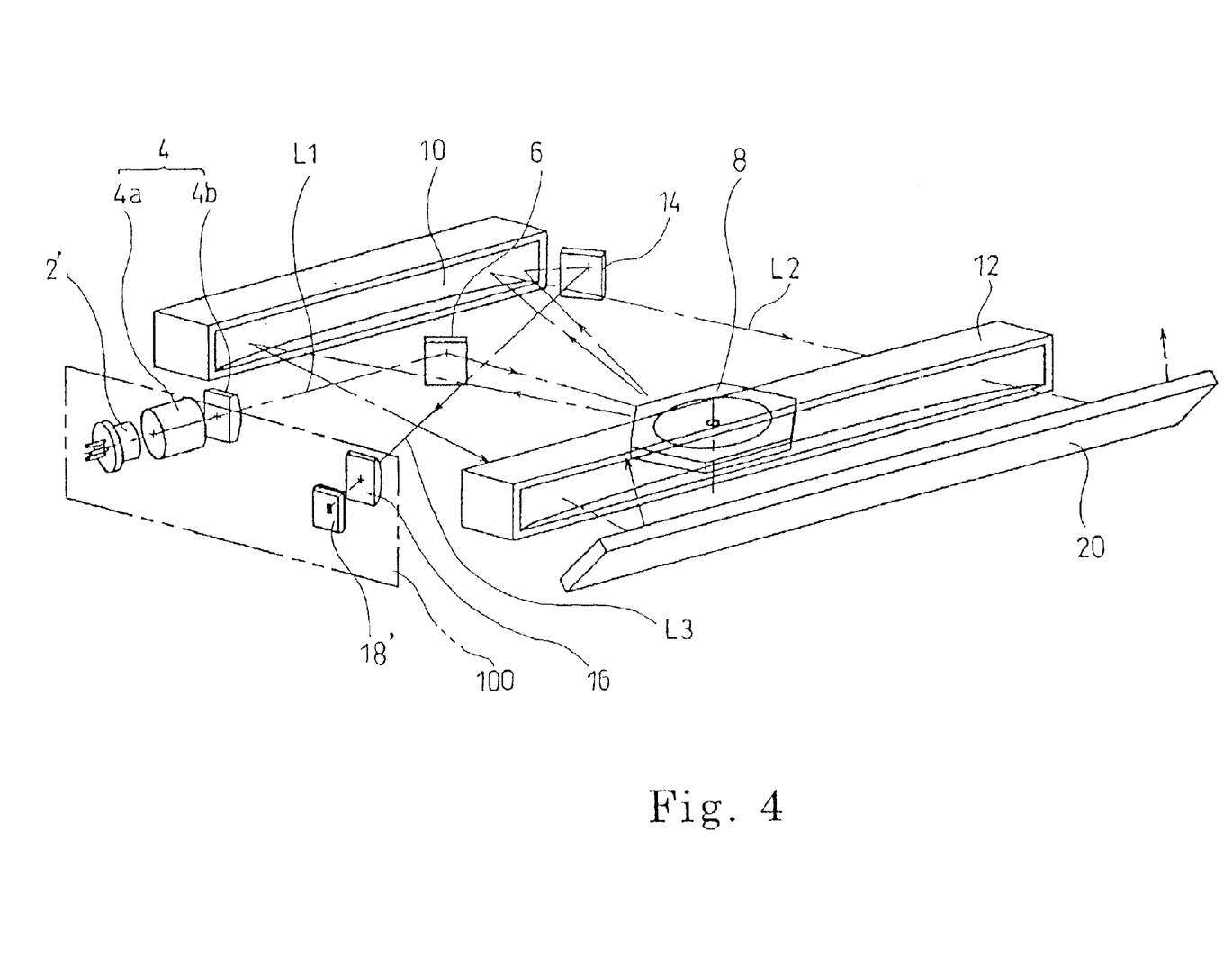
FIG. 4 is a perspective view of the scanning optical system of a laser-beam scanner in which a photo-detector and a light-beam emitter are supported on a common circuit substrate.

FIG. 4 shows an embodiment in which, so as not to relatively move, the laser-beam detector 18' (photo-detector) and the laser diode 2' (light-beam emitter) are supported on a common circuit substrate 100. In this construction, since the laser-beam detector 18' is fixed to the substrate 100, the type of adjusting device that moves the photo-detector (i.e., the laser-beam detector 18') cannot be used. However, in the above-described adjusting device of the present invention, the cylindrical lens 16 is rotated in order to perform adjustment; therefore, the timing of the incident laser beam L3 on the laser-beam detector 18' can be adjusted regardless of the type of photo-detector being utilized.

Figure 5:
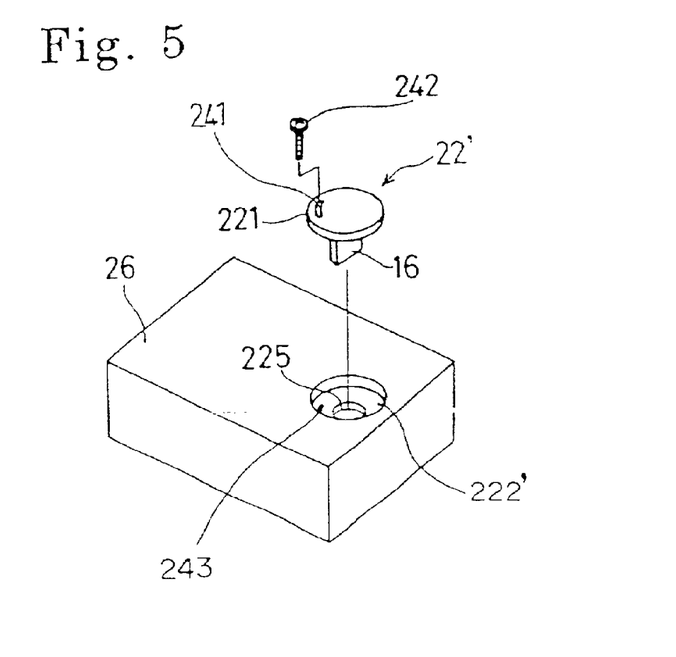
FIG. 5 is an exploded perspective view of another embodiment of the device for adjusting the rotational position of the cylindrical lens.

The device for adjusting the rotational position of the cylindrical lens 16 (and fixing the cylindrical lens 16 to the housing 26) is not limited solely to the particular aforementioned device (i.e., the adjusting device 24) but can be any other device as long as it bears a similar function. FIG. 5 shows another embodiment of the adjusting device for adjusting the rotational position of the cylindrical lens 16. In this embodiment the housing 26 is provided on a bottom surface thereof with a circular recess 222' which corresponds to the circular recess 222 of the previous embodiment. A circular through hole 225 through which the cylindrical lens 16 can be inserted in the housing 26 is formed at the center of the bottom of the circular recess 222'. A rotatable base 22', which corresponds to the rotatable base 22 of the previous embodiment, is not provided with a shaft which corresponds to the shaft 224 of the rotatable base 22. When the rotatable base 22' is set on the housing 26, the disc portion 221 of the rotatable base 22' is rotatably fitted in the circular recess 222' with the cylindrical lens 16 being inserted into the housing 26 through the through hole 225. With such a adjusting (fixing) device, the cylindrical lens 16 can be fixed to the housing 26 in place from outside the housing 26, which makes it easier to set the cylindrical lens 16 on the housing 26.

Figure 6:
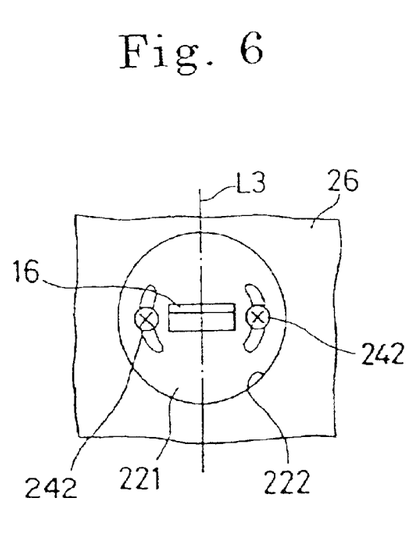
FIG. 6 is a plan view of still another embodiment of the device for adjusting the rotational position of the cylindrical lens.
Figure 7:
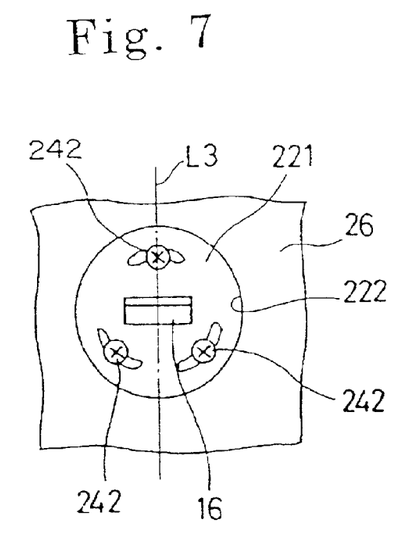
FIG. 7 is a plan view of yet another embodiment of the device for adjusting the rotational position of the cylindrical lens.

In the aforementioned embodiments, the rotatable base 22 (or 22') is fixed to the housing 26 using only one set screw 242. However, the rotatable base 22 (or 22') can be fixed to the housing using more than one set screw. FIG. 6 shows another embodiment using two set screws 242 to fix the disc portion 221 of the rotatable base 22 to the housing 26. FIG. 7 shows yet another embodiment using three set screws 242 to fix the disc portion 221 of the rotatable base 22 to the housing 26. In FIG. 6 the two set screws 242 are positioned on respective sides with respect to the path of the laser beam L3 so as to face respective ends (right and left ends as viewed in FIG. 6) of the cylindrical lens 16. In FIG. 7 the three set screws 242 are positioned at regular intervals in a circumferential direction of the disc portion 221.

Figure 8:
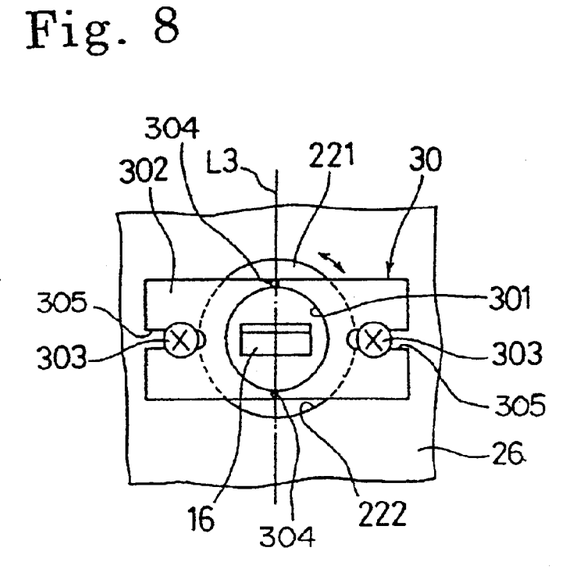
FIG. 8 is a plan view of yet another embodiment of the device for adjusting the rotational position of the cylindrical lens.

FIG. 8 shows another embodiment of the adjusting device for adjusting the rotational position of the cylindrical lens 16. In this embodiment the disc portion 221 is fixed to the housing 26 by a adjusting device 30 which is composed of a leaf spring 302 and two set screws 303 for securing the leaf spring 302 to the housing 26. The leaf spring 302 has a substantially rectangular shape and is provided at a center thereof with a circular hole 301 in which the cylindrical lens 16 is positioned. The longitudinal length of the leaf spring 302 is larger than the diameter of the disc portion 221 so as to press the same against the housing 26. The leaf spring 302 is provided, on a surface thereof facing the disc portion 221, with two projections 304 which are positioned on respective sides with respect to the cylindrical lens 16 to be aligned along the path of the laser beam L3, as can be seen in FIG. 8. The leaf spring 302 is further provided at respective ends thereof with two slits through which the two set screws are respectively inserted to be screwed into the housing 26. In a state where the leaf spring 302 is tightly secured to the housing 26 by the set screws 303, the two projections 304 of the leaf spring 302 come into pressing contact with the disc portion 221, so that the disc portion 221 is tightly held between the leaf spring 302 and the housing 26, so that the disc portion 221 is fixed to the housing 26.

Figure 9:
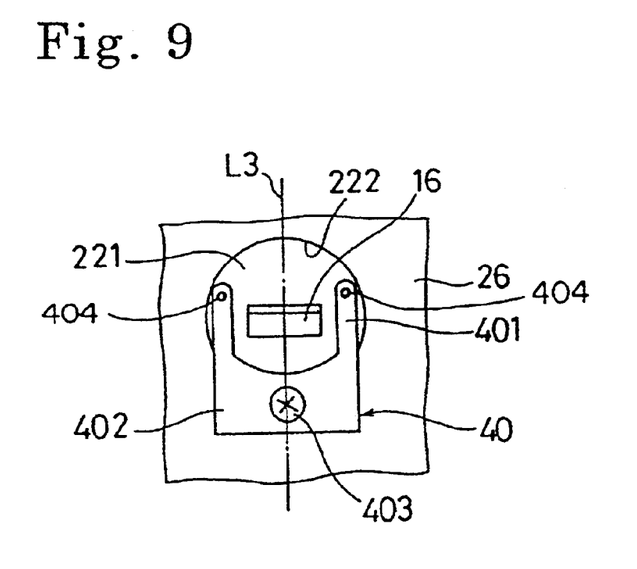
FIG. 9 is a plan view of yet another embodiment of the device for adjusting the rotational position of the cylindrical lens.

FIG. 9 shows yet another embodiment of the adjusting device for adjusting the rotational position of the cylindrical lens 16. In this embodiment the disc portion 221 is fixed to the housing 26 by a adjusting device 40 which includes a leaf spring 402 and a set screw 403 for securing the leaf spring 402 to the housing 26. The leaf spring 402 has a substantially U-shape and is provided with two parallel projecting portions 401 between which the cylindrical lens 16 is positioned. The projecting portions 401 are positioned on respective sides relative to the path of the laser beam L3, as can be seen in FIG. 9. Each projecting portion 401 is provided, at its tip on a surface thereof facing the disc portion 221, with a projection 404. In a state where the leaf spring 402 is tightly secured to the housing 26 by the set screw 403, the two projections 404 of the leaf spring 402 come into pressing contact with the disc portion 221, so that the disc portion 221 is tightly held between the leaf spring 402 and the housing 26, so that the disc portion 221 is fixed to the housing 26.

Figure 10:
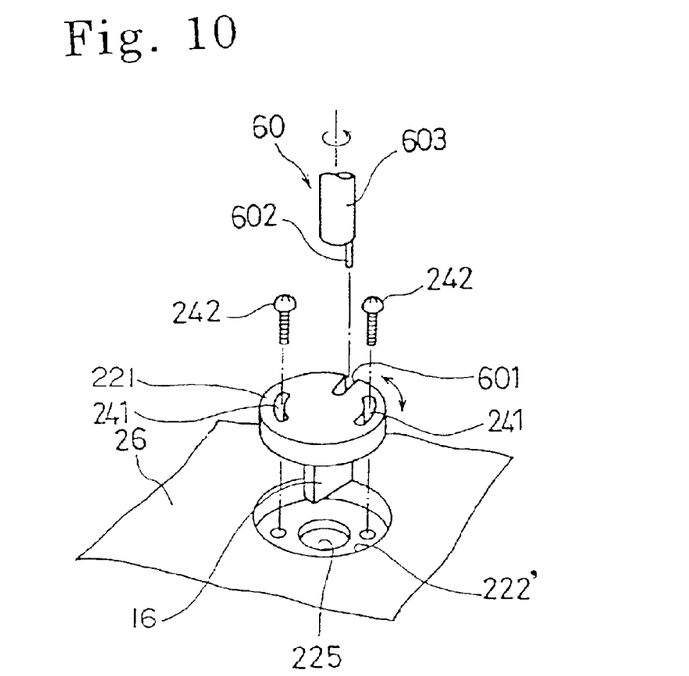
FIG. 10 is a perspective view of an embodiment of a device for rotating the cylindrical lens.

FIG. 10 shows an embodiment of device for rotating the cylindrical lens 16. In this embodiment, the cylindrical lens 16 is positioned in place by inserting the same into the housing 26 from outside the housing 26, and the operation of rotating the cylindrical lens 16 can be carried out from outside the housing 26.

In this embodiment, similar to the embodiment shown in FIG. 5, the housing 26 is provided on a bottom surface thereof with a circular recess 222'. A circular through hole 225 through which the cylindrical lens 16 can be inserted in the housing 26 is formed at the center of the bottom of the circular recess 222'. The disc portion 221 of this embodiment is provided with two circumferential slots 241 for fixing the disc portion 221 to the housing 26 by two set screws 242 respectively inserted into the two circumferential slots 241. The disc portion 221 is further provided with a radial slot 601 which extends in a radial direction of the disc portion 221. The disc portion 221 is rotatably fitted in the circular recess 222' with the cylindrical lens 16 being inserted into the housing 26 through the through hole 225. A tool 603 is used to rotate the cylindrical lens 16. The tool 603 is provided at the tip thereof with an engaging pin 602 which can be inserted into the radial slot 601. The axis of the engaging pin 602 extends parallel with, but deviates from, the rotational axis of the tool 603, so that the disc portion 221 is rotated when the tool 603 rotates about its rotational axis with the engaging pin 602 being inserted into the radial slot 601. Each set screw 242 needs to be loosened in advance when the disc portion 221 is rotated by the tool 603. The slot 601 and the tool 603 together constitute a device 60 for externally rotating the cylindrical lens 16.

In a state where the engaging pin 602 is engaged with the radial slot 601, rotating the tool 603 without moving the same in a radial direction thereof causes the disc portion 221 (the cylindrical lens 16) to rotate clockwise or counterclockwise in a direction shown by an arrow in FIG. 10. Hence, with the use of the device 60, the incident position of the laser beam L3 on the laser-beam detector 18 can be finely and easily adjusted even from outside the housing 26 of the scanner. After the adjusting operation (i.e., the rotation of the cylindrical lens 16) is completed, the tool 603 is disengaged from the disc portion 221 and subsequently each set screw 242 is tightly fastened to fix the disc portion 221 to the circular recess 222' of the housing 26, which completes the adjusting operation.

Figure 11:
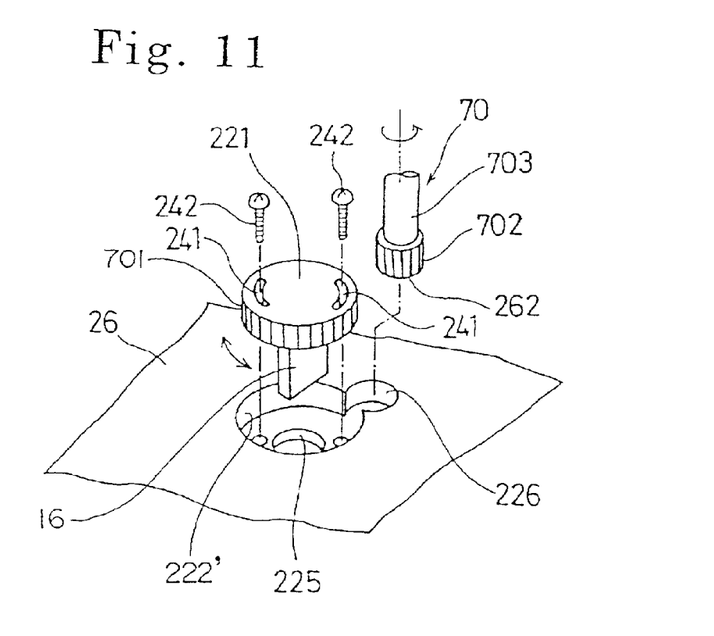
FIG. 11 is a perspective view of another embodiment of the device for rotating the cylindrical lens.

FIG. 11 shows another embodiment of a device for rotating the cylindrical lens 16. In this embodiment, similar to the previous embodiment shown in FIG. 10, the cylindrical lens 16 is positioned in place by inserting the same into the housing 26 from outside the housing 26, and the operation of rotating the cylindrical lens 16 can be carried out from outside the housing 26. The housing 26 is provided on a bottom surface thereof with a circular recess 222'. A circular through hole 225 through which the cylindrical lens 16 can be inserted in the housing 26 is formed at the center of the bottom of the circular recess 222'. The disc portion 221 of this embodiment is provided with two circumferential slots 241 for fixing the disc portion 221 to the housing 26 by two set screws 242 respectively inserted into the two circumferential slots 241. The disc portion 221 is further provided on an outer peripheral surface thereof with a circumferential gear 701. The disc portion 221 is rotatably fitted in the circular recess 222' with the cylindrical lens 16 being inserted into the housing 26 through the through hole 225. The housing 26 is provided with a small circular recess 226 which is connected with the circular recess 222'. In this embodiment a tool 703 is used to rotate the cylindrical lens 16. The tool 703 is provided at the tip thereof with a pinion gear 702 which can be fitted in the small circular recess 226. The pinion gear 702 meshes with the circumferential gear 701 of the disc portion 221 when the pinion gear 702 is fitted in the small circular recess 226. Each set screw 242 needs to be loosened in advance when the disc portion 221 is rotated by the tool 703. The circumferential gear 701, the tool 703 and the small circular recess 226 together constitute a device 70 for rotating the cylindrical lens 16.

The pinion gear 702 is engaged with the circumferential gear 701 by inserting the pinion gear 702 into the small circular recess 226 when the cylindrical lens 16 needs to be rotated. In a state where the pinion gear 702 is engaged with the circumferential gear 701, rotating the tool 703 causes the disc portion 221 (the cylindrical lens 16) to rotate clockwise or counterclockwise in a direction shown by an arrow in FIG. 11. Hence, with the use of the device 70, the incident position of the laser beam L3 on the laser-beam detector 18 can be finely and easily adjusted even from outside the housing 26 of the scanner. After the adjusting operation (i.e., rotation of the cylindrical lens 16) is completed, the tool 703 is taken out of the small circular recess 226 of the housing 26 and subsequently each set screw 242 is tightly fastened to fix the disc portion 221 to the circular recess 222 of the housing 26, which completes the adjusting operation.

In each of the aforementioned embodiments, although the cylindrical lens 16 as an optical member is fixed to the disc portion 221, the cylindrical lens 16 can be replaced by a plane-parallel plate to attain a similar effect. FIGS. 3A and 3B show a sectional portion of the cylindrical lens 16; the sectional portion of the cylindrical lens 16 does not have any power in scanning (beam shifting) direction (right to left in FIGS. 3A and 3B) with respect to the laser-beam detector 18. In view of this aspect, if this sectional portion is replaced by an equivalent plane-parallel plate that does not have any power in the scanning direction, a similar beam-shifting effect as shown in FIGS. 3A and 3B is carried out by rotating the plane-parallel plate. However, a cylindrical lens 16 is used in the above-described embodiment as the cylindrical lens facilitates collection of the laser beam L3 onto the laser-beam detector 18.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A scanner comprising:
   a light-beam emitter for emitting a light beam;
   a light-beam deflector for deflecting said light beam to scan a scanning surface;

a photo-detector provided at a position outside an image-forming scanning range of said scanning surface to detect a scanning light beam before said scanning light beam starts generating a scanning line in said image-forming scanning range;

a rotatable member located in front of an incident surface of said photo-detector, said rotatable member being rotatable about a rotational axis perpendicular to a plane defined by said scanning light beam by said deflector;

an optical member that is provided on said rotatable member, said optical member allowing said scanning light beam to pass therethrough to be incident upon said incident surface of said photo-detector;

a device for rotating said rotatable member about said rotational axis, said device comprising a radial slot formed on said rotatable member to extend in a radial direction thereof and a rotating tool engageable with said rotatable member to rotate said rotatable member about said rotational axis, wherein said tool comprises an engaging pin engageable with said radial slot, an axis of said engaging pin deviating from a rotational axis of said rotating tool.

* * * * *